United States Patent [19]
Nakai et al.

[11] Patent Number: 5,895,613
[45] Date of Patent: Apr. 20, 1999

[54] METHOD OF MANUFACTURING MOLDED PLASTIC PRODUCT WITH PAD

[75] Inventors: Yasuhiro Nakai; Hiroshi Suzuki, both of Anjo, Japan

[73] Assignee: Kabushiki Kaisha Inoac Corporation, Nagoya, Japan

[21] Appl. No.: 08/876,286

[22] Filed: Jun. 16, 1997

[51] Int. Cl.$^6$ .................... B29C 44/06; B29C 44/12
[52] U.S. Cl. .................... 264/46.5; 264/46.6; 264/276
[58] Field of Search .................... 264/46.5, 46.6, 264/276; 156/79

[56] References Cited

U.S. PATENT DOCUMENTS

| | | | |
|---|---|---|---|
| 4,386,982 | 6/1983 | Weinhaus | 156/79 |
| 4,814,036 | 3/1989 | Hatch | 264/276 |
| 4,867,663 | 9/1989 | Woerner et al. | 264/276 |
| 5,071,605 | 12/1991 | Kawaguchi et al. | 264/276 |
| 5,114,639 | 5/1992 | Kurz et al. | 264/276 |
| 5,234,639 | 8/1993 | Smith | 264/276 |
| 5,500,168 | 3/1996 | Suzuki | 264/46.5 |
| 5,500,169 | 3/1996 | Kondo et al. | 264/46.5 |
| 5,618,477 | 4/1997 | Suzuki | 264/276 |

*Primary Examiner*—Alan R. Kuhns
*Attorney, Agent, or Firm*—Armstrong, Westerman, Hattori, McLeland & Naughton

[57] ABSTRACT

A method of manufacturing a molded plastic product prepares a core and a skin. The core has a pad supporting face, a sidewall surrounding the supporting face, and a pad housing defined by the supporting face and sidewall. The skin has a side face to be fitted to the sidewall of the core. The method sets the core on an upper mold so that the pad supporting face is oriented toward a lower mold, and places the skin on the lower mold so that the back face of the skin is oriented toward the pad supporting face. The method closes the upper and lower molds and injects foam ingredients between the core and the skin. The foam ingredients is reacted and adheres to the skin to form the pad as well as to the pad housing, to thereby integrate them into one body. The method is characterized by arranging an elastic seal on the side face of the skin so that the side face of the skin is attached to the sidewall of the pad housing through the elastic seal by the pressure of the reacted foam ingredients.

6 Claims, 7 Drawing Sheets

METHOD OF MANUFACTURING MOLDED PLASTIC PRODUCT WITH PAD

BACKGROUND OF THE INVENTION

1. Field of the Invention

The present invention relates to a method of manufacturing a molded plastic product with a pad.

2. Description of the Related Art

Molded plastic products having pads are used for various purposes including car interior parts and furniture.

Figure 6:
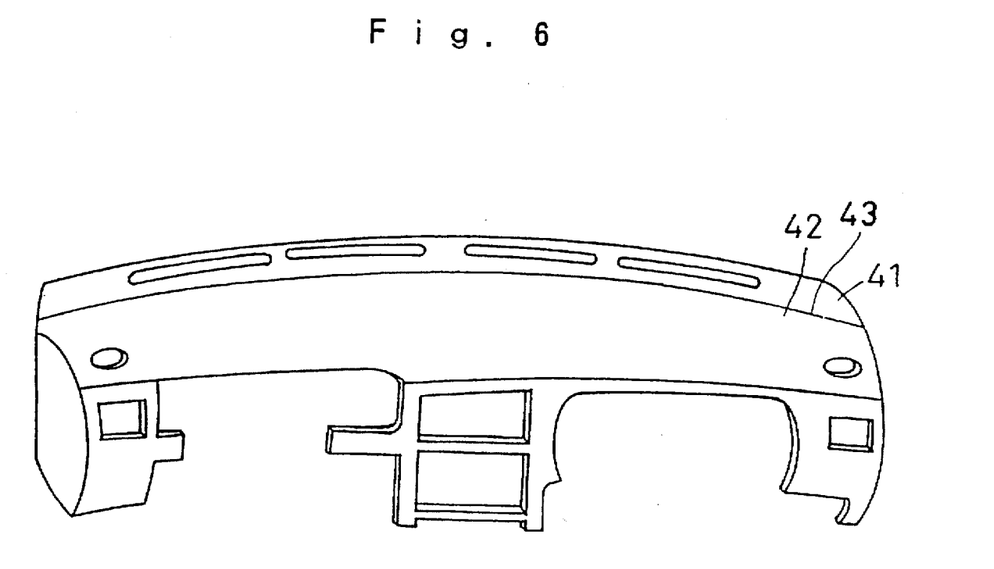
FIG. 6 is a perspective view showing an example of a molded plastic product with a pad.

FIG. 6 shows a car instrument panel as an example of the molded plastic products. The panel is made of a core 41 and a pad 42. The pad 42 is attached to a part of the surface of the core 41. Some products have a pad that entirely covers the surface of a core.

A monolithic molding technique is a simple technique to manufacture a molded plastic product having a pad. This technique forms a foam body that adheres to a skin to make a pad. At the same time, the foam body adheres to a core, so that the pad, and core are integrated into a product.

Figure 7:
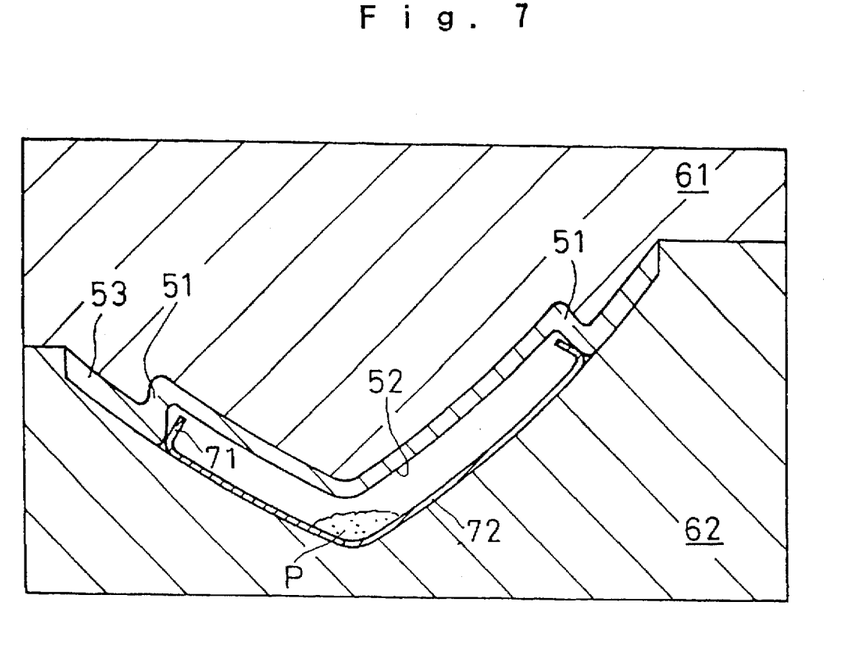
FIG. 7 is a sectional view showing the manufacturing of a molded plastic product with a pad according to a prior art.

FIG. 7 shows an example of the monolithic molding technique. A core 53 has a sidewall 51 surrounding a pad housing 52. The core 53 is set on an upper mold 61. A skin 72 to form a pad has a side face 71. The skin 72 is set on a lower mold 62 so that the side face 71 is in contact with the sidewall 51 of the pad housing 52. A foam ingredients P is activated to produce foam between the core housing 52 and the skin 72, to integrate them into one body.

Figure 8:
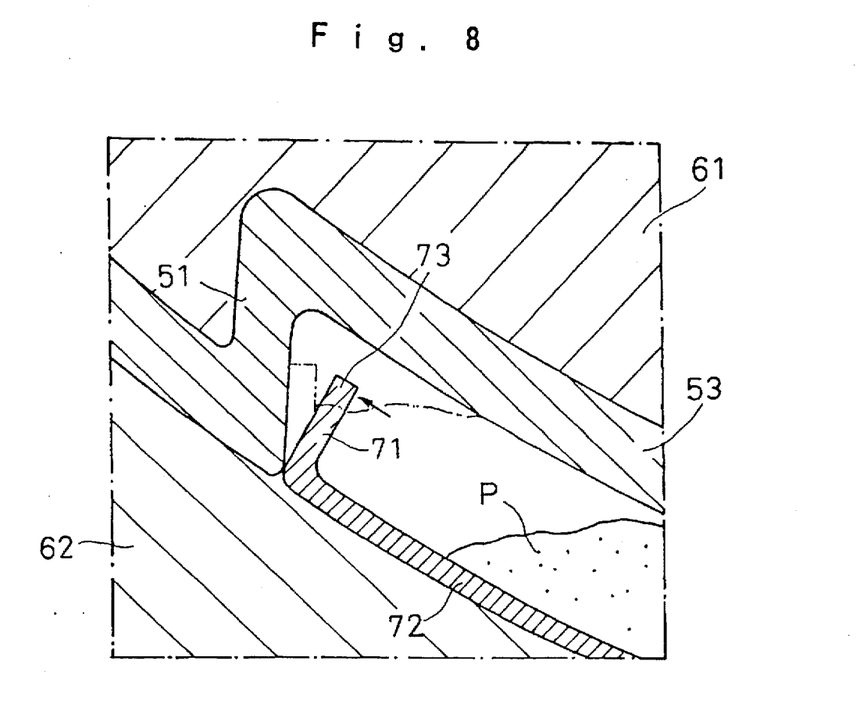
FIG. 8 is an enlarged section showing an essential part of FIG. 7 with foam ingredients risen.

FIG. 8 is an enlarged section showing an essential part of FIG. 7. The foam produced by the foam ingredients P fills a space between the core 53 and the skin 72. The pressure generated by foaming of the foam ingredients presses the side face 71 against the sidewall 51 as indicated with a dotted line, thereby preventing the foam from oozing onto the surface of the skin 72. The foam ingredients P, skin 72, and core 53 are solidified together due to the self-adhesive property of the foam ingredients P.

Figure 9:
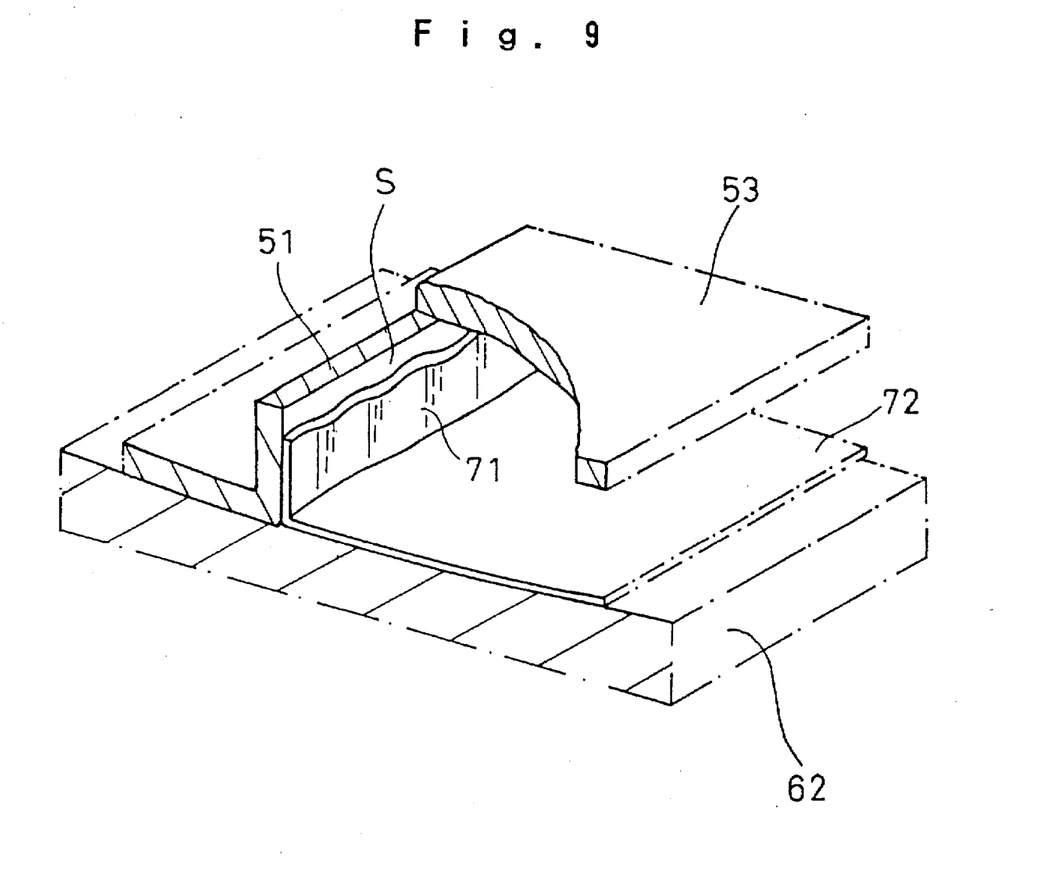
FIG. 9 is a partly broken perspective view showing a skin with a deformed side face according to the prior art.

This prior art, however, has some problems. The side face 71 of the skin 72 has low rigidity because of a free end 73. The side face 71 is easily deformed or corrugated during storage or on the lower mold 62. Once the side face 71 is deformed, it causes a gap S with respect to the sidewall 51 of the core 53 as shown in FIG. 9. Then, the foam ingredients P may ooze onto the surface of the skin 72, to spoil the appearance of the product or cause unfilledspots in the pad. In FIG. 6, the pad 42 is arranged at a part of the surface of the core 41 (corresponding to the core 53 of FIG. 8). If the foam ingredients leaks through a boundary 43 onto the surfaces of the core 41 and pad 42, the appearance of the instrument panel is spoiled.

The deformed side face 71 will not restore to its original shape even if the skin 72 is heated. This problem is difficult to solve.

SUMMARY OF THE INVENTION

An object of the present invention is to provide a method of easily manufacturing a molded plastic product. The product consists of a pad and a core. The pad is made of a foam body and a skin that covers the surface and side face of the foam body. The core has a pad housing for accommodating the pad. The product efficiently prevents foam ingredients from leaking through a gap between the skin and the core housing onto the surface of the skin, thereby maintaining the good appearance and quality of the product.

In order to accomplish the object, a method of manufacturing a molded plastic product according to the present invention includes the steps of preparing a core having a pad supporting face, a sidewall surrounding the supporting face, and a pad housing defined by the supporting face and sidewall, setting the core on an upper mold so that the pad supporting face is oriented toward a lower mold, preparing a skin having a side face to be fitted to the sidewall of the core, setting the skin on the lower mold so that the back face of the skin is oriented toward the pad supporting face of the core, closing the upper and lower molds, and injecting and rising foam ingredients between the core and the skin. The foam ingredients adheres to the skin to form the pad as well as to the pad housing, to thereby integrate them into one body. The method is characterized by arranging an elastic seal on the side face of the skin so that the side face of the skin is attached to the sidewall of the pad housing through the elastic seal by the pressure of the foaming foam ingredients.

The elastic seal reinforces the side face of the skin, to prevent the side face from being deformed or corrugated when the skin is placed on the lower mold. As a result, the foam ingredients that fills the space between the skin and the core presses the side face of the skin against the sidewall of the pad housing of the core through the elastic seal, to tightly seal a boundary between the side face and the sidewall without any gap.

Even if the side face of the skin is slightly deformed, the elastic seal is elastically deformed accordingly between the side face and the sidewall, thereby properly sealing them.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

Figure 1:
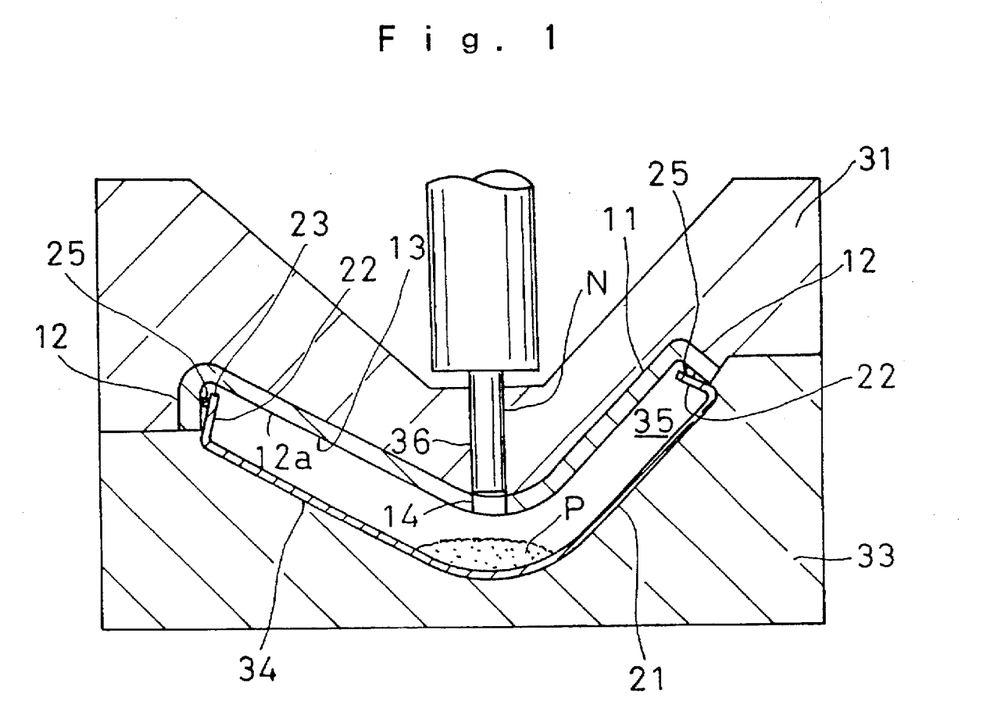
FIG. 1 is a sectional view showing a core, a skin, and foam ingredients placed on molds according to an embodiment of the present invention.

FIG. 1 is a sectional view showing a method of manufacturing a molded plastic product according to an embodiment of the present invention.

A core 11 has a pad supporting face 12a to be covered with a pad. The face 12a is surrounded with a sidewall 12 to define a pad housing 13 that is dented from the surface toward the back face of the core 11. The core 11 is made from a hard plastic such as acrylonitrile-butadiene-styrene (ABS) resin or polypropylene, or a shape-keeping plastic such as fiber-reinforced plastics.

An injection port 14 is formed through the core 11, to inject foam ingredients P between the core 11 and a skin 21 after molds 31 and 33 are closed.

The pad housing 13 may be formed at a part of the core 11 like the pad housing 52 of the core 53 of the prior art of FIG. 7. The sidewall 12 may partly surround the pad housing 13. For example, a car instrument panel (such as one shown in FIG. 6) has an invisible part that is positioned just under a front windshield. At such an invisible part, the pad housing of the core is not provided with a sidewall.

The skin 21 has a required shape and is made of plastic leather manufactured by vacuum molding or slush molding. The skin 21 has a side face 22 that is bent backward. The side face 22 is shaped to fit with the pad housing 13 and face the sidewall 12.

Figure 2:
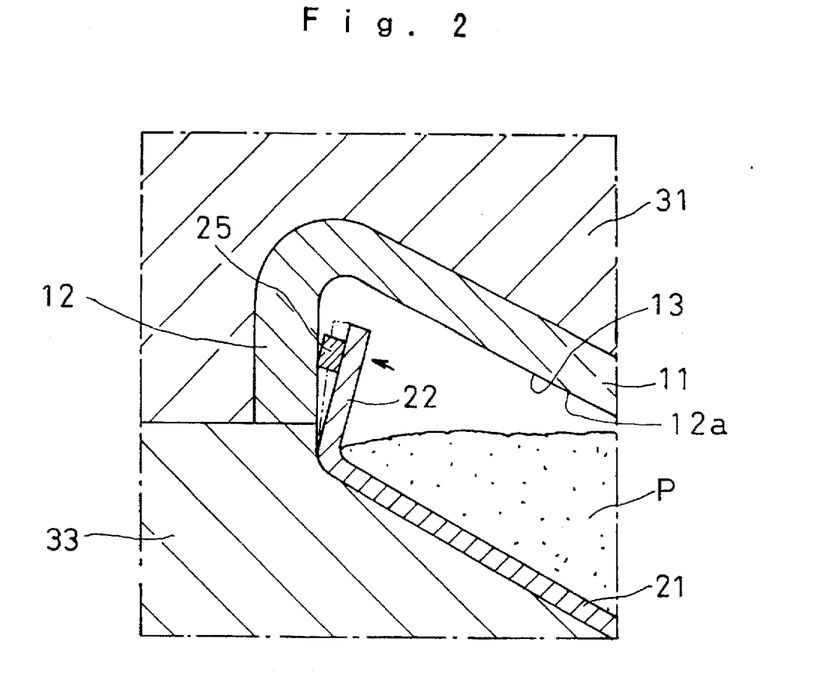
FIG. 2 is an enlarged section showing an essential part of FIG. 1 during foaming.
Figure 4:
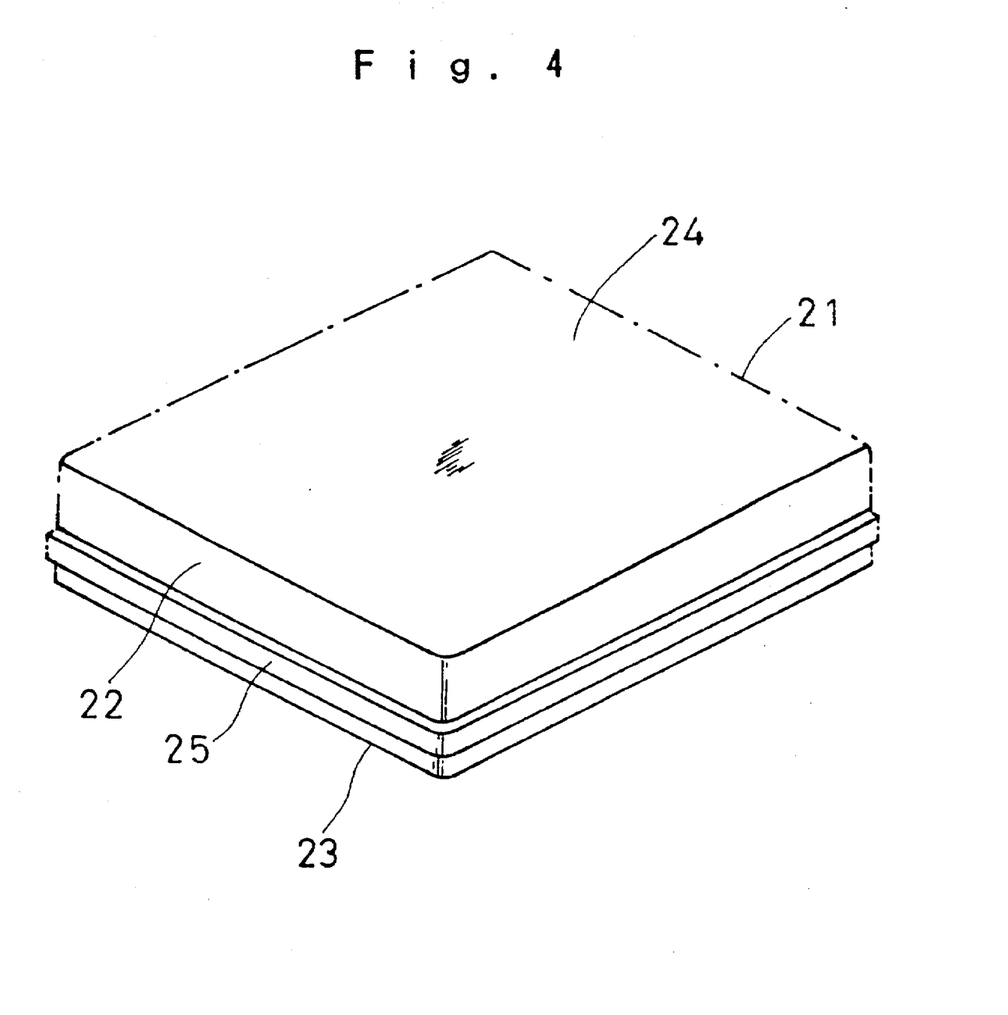
FIG. 4 is a perspective view showing an essential part of a skin according to the present invention.

FIG. 2 is an enlarged section showing an essential part of FIG. 1. The side face 22 of the skin 21 is provided with a ribbon-like elastic seal 25. The elastic seal 25 is arranged along a free end 23 of the side face 22 and is bonded to the side face 22, to face the sidewall 12 of the pad housing 13. The elastic seal 25 reinforces the rigidity of the side face 22 and prevents the side face 22 from being deformed or corrugated when the skin 21 is placed on the lower mold 33 or when the upper and lower molds 31 and 33 are closed. At the same time, the elastic seal 25 seals a gap between the side face 22 of the skin 21 and the sidewall 12 of the core 11. The elastic seal 25 is made of flexible foam such as polyurethane foam, nonwoven fabric, or hot-melt foaming resin. In particular, ribbon-like polyurethane foam is preferable for the elastic seal 25 because it is easy to handle and has a good sealing property. It is preferable to arrange the elastic seal 25 away from the surface 24 (FIG. 4) of the skin 21 and close to the free end 23 thereof. This results in reinforcing the rigidity of the free end 23, improving the sealing effect, and concealing the elastic seal 25 to improve the appearance of the product. For example, the elastic seal 25 is 2 mm×2 mm in cross section and is 3 mm distant from the free end 23.

Figure 5:
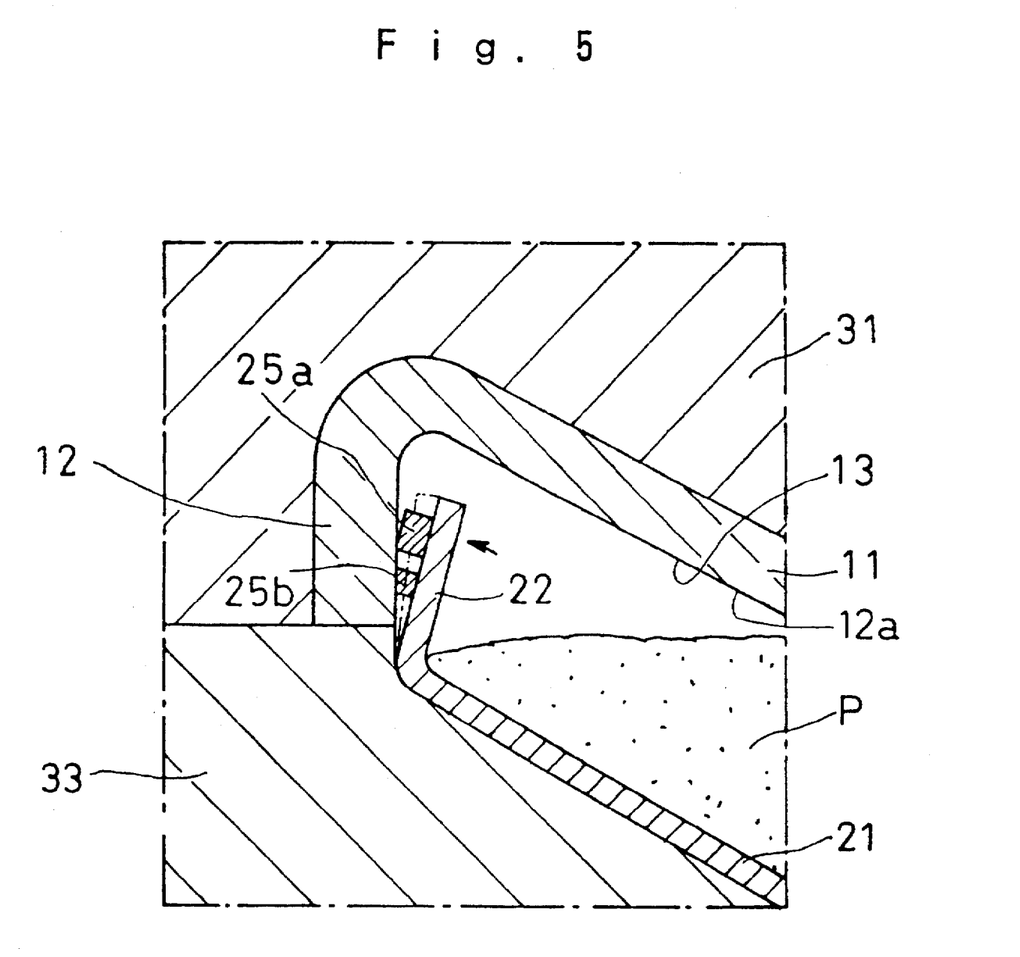
FIG. 5 is an enlarged section showing an essential part of molds containing a core, a skin, and foam ingredients according to another embodiment of the present invention.

It is possible to arrange two or more elastic seals in parallel with one another on the side face 22 of the skin 21. FIG. 5 shows an embodiment of the present invention that arranges two elastic seals 25a and 25b in parallel with each other on the side face 22 of the skin 21. This arrangement further improves the rigidity of the side face 22 and prevents the side face 22 from being deformed or corrugated.

The core 11 is set on the upper mold 31 so that the pad supporting face 13 faces the lower mold 33. The skin 21 is set on the lower mold 33. The upper and lower molds 31 and 33 are closed.

The core 11 is set on the upper mold 31 such that an edge of the sidewall 12 is oriented toward the lower mold 33. Clips (not shown) are used to attach the core 11 to the upper mold 31.

The skin 21 is set on the lower mold 33 such that the back face thereof faces the pad housing 13 of the core 11 in the top mold 31 and such that the side face 22 is received in the pad housing 13 when the upper and lower molds 31 and 33 are closed. To easily position the skin 21, the lower mold 33 has a skin base 34 that is stepped down from a peripheral face. A cavity 35 is defined between the upper and lower molds 31 and 33.

When the upper and lower molds 31 and 33 are closed, the side face 22 of the skin 21 is fitted into and caps the pad housing 13 of the core 11. At this time, the side face 22 is in contact with the sidewall 12 of the pad housing 13, and the free end 23 is slightly away from the sidewall 12. Since the elastic seal 25 improves the rigidity of the side face 22, the side face 22 is hardly deformed or corrugated when the skin 21 is set on the lower mold 33 and when the upper and lower molds 31 and 33 are closed. As a result, irregular gaps are seldom formed between the side face 22 and the sidewall 12.

The upper mold 31 has an injection port 36 into which a nozzle N of a foam apparatus is inserted. The foam apparatus injects liquid foam ingredients P such as liquid polyurethane into the space between the pad supporting face 12a of the core 11 and the skin 21 through the injection port 14 of the core 11.

Figure 3:
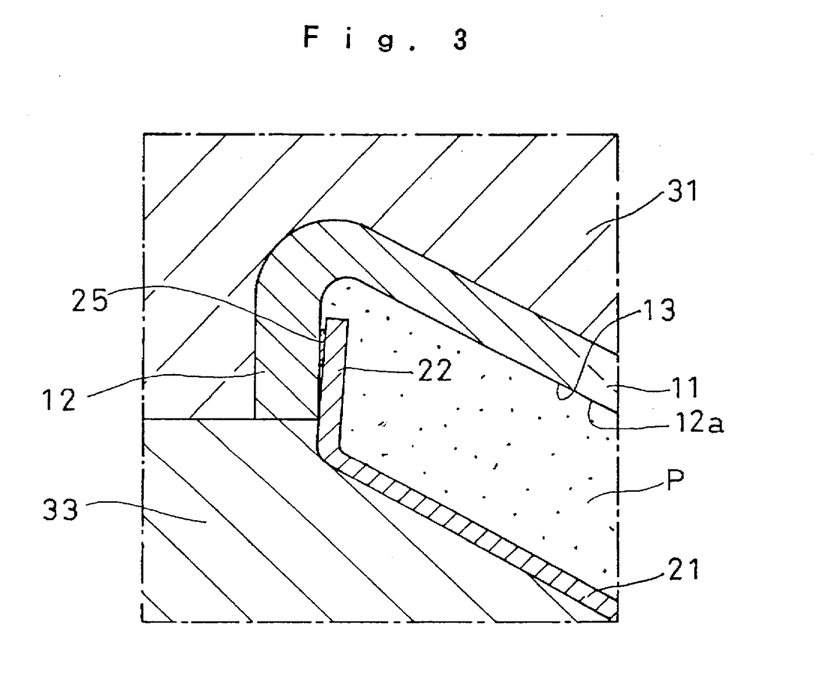
FIG. 3 is an enlarged section showing a sealed state that follows the state of FIG. 2.

The foam ingredients P is risen to fill the pad housing 13 and to reach the side face 22 of the skin 21 as shown in FIG. 2. The foaming pressure generated and increased by foaming of the foam ingredients P presses the side face 22 against the sidewall 12 of the pad housing 13. Then, the elastic seal 25 is pressed against the sidewall 12, to seal a gap between the side face 22 and the sidewall 12 as shown in FIG. 3. At this time, the elastic seal 25 prevents the side face 22 from being corrugated. The elastic seal 25 is elastically compressed and tightly attached to the sidewall 12, to surely seal the side face 22 and sidewall 12 and prevent the foam ingredients P from leaking through the side face 22 onto the surface of the skin 21.

The foam ingredients P is self-adhesive to adhere to the skin 21 to form a pad as well as adhering to the core 11.

Thereafter, the upper and lower molds 31 and 33 are opened, and the molded plastic product having the pad is demolded.

With the elastic seal 25 sealing any gap between the side face 22 of the skin 21 and the sidewall 12 of the pad housing 13 of the core 11, the product has a good appearance because the foam ingredients P never leaks through the side face 22 and sidewall 12. Since the elastic seal 25 is close to the free end 23 of the side face 22, it is invisible from the outside, and therefore, a joint between the pad and the core has a good appearance.

Unlike an open-mold injection technique that injects foam ingredients into molds while the molds are open, the close-mold injection technique mentioned above injects foam ingredients into molds after the molds are closed. Accordingly, the close-mold injection technique is free from unevenness in the quality of products due to fluctuations in the timing of closing the molds.

As explained above, the present invention provides a molded plastic product having a pad made of a skin that is provided with an elastic seal. The elastic seal is attached to a side face of the skin, to improve the rigidity of the skin so that the side face is hardly deformed or corrugated when the skin is set on a lower mold and when the lower mold is closed with an upper mold. When foam ingredients is risen between the skin and a pad housing of a core, the pressure of the foam ingredients presses the elastic seal against the sidewall of the pad housing. This results in completely sealing a gap between the side face of the skin and the sidewall of the pad housing, to prevent the foam ingredients from oozing onto the surface of the skin and provide the product with a good appearance.

Many different embodiments of the present invention may be constructed without departing from the spirit and scope of the present invention, and it should be understood that the present invention is not limited to the specific embodiments described in this specification, except as defined in the appended claims.

What is claimed is:

1. A method of manufacturing a molded plastic product having a pad, including the steps of:

preparing a core having a pad supporting face, a sidewall surrounding the pad supporting face, and a pad housing defined by the pad supporting face and the sidewall;

preparing a skin which has a bent side face to be fitted to the sidewall and is provided with a ribbon-like elastic seal bonded along a free end of the side face;

setting the core on an upper mold so that the pad supporting face is oriented toward a lower mold;

setting the skin on the lower mold so that a back face of the skin is oriented toward the pad supporting face and that the side face is fitted to the sidewall through the elastic seal when the upper and lower molds are closed; and foaming foam ingredients between the pad supporting face and the skin, the foam ingredients adhering to the skin to form the pad as well as to the pad housing, to thereby integrate them into one body and attach the side face to the sidewall through the elastic seal by the pressure of the reacted foam ingredients.

2. The method of manufacturing a molded plastic product having a pad as recited in claim 1, wherein the elastic seal is made of a material selected from the group consisting of flexible polyurethane foam, nonwoven fabric, and hot-melt foaming resin.

3. The method of manufacturing a molded plastic product having a pad as recited in claim 1, wherein the step of preparing the skin includes bonding a plurality of elastic seals in parallel with one another along the free end of the side face.

4. The method of manufacturing a molded plastic product having a pad as recited in claim 1, further including the steps of closing the upper and lower molds; and injecting the foam ingredients into a space between the core and the skin in the molds.

5. A method of manufacturing a molded plastic product having a pad, including the steps of:

preparing a core having a pad supporting face, a sidewall surrounding the pad supporting face, and a pad housing defined by the pad supporting face and the sidewall;

preparing a skin which has a bent side face to be fitted to the sidewall and is provided with a ribbon-like elastic seal bonded along a free end of the side face;

setting the core on an upper mold so that the pad supporting face is oriented toward a lower mold;

setting the skin on the lower mold so that a back face of the skin is oriented toward the pad supporting face and that the side face is fitted to the sidewall through the elastic seal when the upper and lower molds are closed;

closing the upper and lower molds;

injecting foam ingredients into a space between the pad supporting face and the skin in the molds; and foaming the foam ingredients in the space whereby the side face is attached to the sidewall through the elastic seal by the pressure of the reacted foam ingredients.

6. The method of manufacturing a molded plastic product having a pad as recited in claim 5, wherein the elastic seal is made of a material selected from the group consisting of flexible polyurethane foam, nonwoven fabric, and hot-melt foaming resin.

\* \* \* \* \*